United States Patent [19]

Tsujikura et al.

[11] Patent Number: 5,071,604

[45] Date of Patent: Dec. 10, 1991

[54] MULTI-LAYER PARISON FORMING APPARATUS AND PROCESS

[75] Inventors: Takashi Tsujikura, Yokohama; Keiji Fukuhara, Hiroshima, both of Japan

[73] Assignees: The Japan Steel Works, Tokyo; Mazda Motor Corporation, Hiroshima, both of Japan

[21] Appl. No.: 428,042

[22] Filed: Oct. 27, 1989

[30] Foreign Application Priority Data

Oct. 31, 1988 [JP] Japan .................. 63-277011

[51] Int. Cl.$^5$ ............................................. B29C 47/92
[52] U.S. Cl. .................................. 264/40.7; 264/515; 264/167; 264/173; 425/133.1; 425/149; 425/166; 425/170; 425/381; 425/462; 425/532
[58] Field of Search .................. 264/541, 173, 40.5, 264/40.7, 515, 167; 425/131.1, 133.1, 132, 462, 381, 532, 140, 150, 162, 149, 169, 170, 166

[56] References Cited

U.S. PATENT DOCUMENTS

| | | | |
|---|---|---|---|
| 3,724,985 | 4/1973 | Burlis et al. | 425/132 |
| 4,056,344 | 11/1977 | Lemelson . | |
| 4,179,251 | 12/1979 | Hess et al. | 425/140 |
| 4,217,635 | 8/1980 | Handte et al. | 425/381 |
| 4,522,775 | 6/1985 | Briggs et al. . | |
| 4,563,147 | 1/1986 | Langecker | 264/40.5 |
| 4,717,326 | 1/1988 | Motonaga et al. . | |
| 4,758,144 | 7/1988 | Becker | 425/532 |
| 4,798,526 | 1/1989 | Briggs et al. . | |
| 4,824,618 | 4/1989 | Strum et al. | 264/40.7 |
| 4,867,664 | 9/1989 | Fukuhara | 425/381 |
| 4,907,957 | 3/1990 | Nakagawa et al. | 425/150 |

FOREIGN PATENT DOCUMENTS

| | | | |
|---|---|---|---|
| 58-23212 | 5/1983 | Japan . | |
| 62-99115 | 5/1987 | Japan | 425/133.1 |
| 63-262211 | 10/1988 | Japan | 425/131.1 |

Primary Examiner—Jeffery Thurlow
Attorney, Agent, or Firm—Wenderoth, Lind & Ponack

[57] ABSTRACT

A multi-layer parison has a plurality of layers of main and auxiliary resins laminated with each other. An apparatus for forming the multi-layer parison includes a main resin extruding mechanism, at least one auxiliary resin extruding mechanism and a control unit for controlling the main and auxiliary resin extruding mechanisms so that the pressure for extruding the auxiliary resin is immediately increased and the pressure for extruding the main resin is gradually increased at the beginning of extrusion of the main and auxiliary resins.

6 Claims, 5 Drawing Sheets

Fig. 5(a) SWITCH 72
Fig. 5(b) RELAY 74
Fig. 5(c) SWITCH 92
Fig. 5(d) SWITCH 97
Fig. 5(e) SWITCH 95
Fig. 5(f) SWITCH 100
Fig. 5(g) MOV. TERMINAL OF DEVICE 79
Fig. 5(h) VERT. POS. OF PISTON 3
Fig. 5(i) VERT. POS. OF PLUNGER 34
Fig. 5(j) VERT. POS. OF PLUNGER 28
Fig. 5(k) PRESS. OF 1ST. AUX. RESIN
Fig. 5(ℓ) PRESS. OF 2ND AUX. RESIN

MULTI-LAYER PARISON FORMING APPARATUS AND PROCESS

BACKGROUND OF THE INVENTION

1. Field of the Invention

The present invention relates to an apparatus for forming a multi-layer parison having main and auxiliary resin layers laminated with each other by means of extrusion molding in which the multi-layer parison is introduced into a cavity of a molding die.

2. Description of the Related Art

An apparatus for forming a multi-layer parison by means of extrusion molding comprises an accumulator for extruding a main resin by applying a pressure thereto and accumulators each for extruding an auxiliary resin by applying a pressure thereto. The main and auxiliary resins extruded from nozzles of the accumulators are laminated with each other in predetermined thicknesses. Thus, the multi-layer parison is formed.

The multi-layer parison formed in this way is introduced into a cavity of a molding die. Thereafter, air is blown thereinto and the multi-layer parison is cooled in close contact with the inner face of the cavity. Such process is called blow molding, whereby a hollow body, for example, a multi-layer container is molded.

In the aforementioned apparatus, the extrusion of the resins from the accumulators is stopped while the accumulators are refilled with resins. When the blow molding is carried out with the use of a mold in succession to the formation of the multi-layer parison, it is necessary to stop the extrusion of the resins from the accumulators at least when the blow molding is being carried out.

When the extrusion of the resins is resumed, the auxiliary resins occasionally fail to join with the last auxiliary resin extruded in the previous process. In the case where an auxiliary resin is used as a barrier material to improve the impermeability of a multi-layer container so that liquid accommodated in the container is prevented from permeating through the container, it is necessary to perform the blow molding after removing portions having no auxiliary resin. In other words, such portions cannot be effectively used and the so-called yield gets worse.

The Japanese Patent Publication No. 58-23212 discloses an apparatus for forming a multi-layer parison, which is provided with a control device for controlling pressures for extruding main and auxiliary resins so that the pressures are gradually increased at the beginning of extrusion of respective resins.

According to this prior art, each resin layer is prevented from being irregularly formed by gradually increasing the extrusion pressure applied thereto so that discontinuousness of the auxiliary resins will be prevented.

Absorption and adhesion act between molten main and auxiliary resins. Accordingly, the auxiliary resins disposed in the vicinity of nozzle outlets are liable to be drawn by the main resin when the pressure for extruding the main resin increases before the pressures for extruding the auxiliary resins have not increased enough to extrude the auxiliary resins from respective nozzle outlets at the beginning of extrusion of both resins.

In particular, when a multi-layer parison consisting of two main resin layers and an auxiliary resin layer or layers interposed between the main resin layers is formed, the auxiliary resins are still liable to be drawn by the main resin because the auxiliary resins disposed in the nozzle outlets are sandwiched between the two main resins.

In the known multi-layer parison forming apparatus, pressures for extruding main and auxiliary resins gradually increase when the extrusion thereof is started. Accordingly, it is impossible to prevent the auxiliary resins from being drawn by the main resin.

SUMMARY OF THE INVENTION

The present invention has been developed to substantially solve the above-described disadvantages and has for its essential object to provide an improved apparatus, which is capable of forming a high quality multi-layer parison having uniform layers of main and auxiliary resins.

Another important object of the present invention is to provide an apparatus of the above described type, which is capable of enlarging effective portions of the parison.

In accomplishing these and other objects, an apparatus for forming a multi-layer parison according to the present invention includes a first means for extruding a main resin, a second means for extruding at least one auxiliary resin, and a control means for controlling the first and second extruding means so that the pressure for extruding the auxiliary resin is immediately increased and the pressure for extruding the main resin is gradually increased at the beginning of extrusion of the main and auxiliary resins.

In the above-described construction, since the pressure for extruding the main resin gradually increases at the beginning of extrusion thereof, the auxiliary resin disposed in a nozzle outlet is not drawn by the main resin so much.

On the other hand, since the pressure for extruding the auxiliary resin immediately increases, it is hard for discontinuousness of the auxiliary resin to take place even if the auxiliary resin is drawn by the main resin to some extent.

Accordingly, the resins to be used for forming the multi-layer parison can be effectively used, resulting in the improvement of the so-called yield. Further, the quality of a multi-layer container produced by the blow molding can be improved.

BRIEF DESCRIPTION OF THE DRAWINGS

These and other objects and features of the present invention will become apparent from the following description of a preferred embodiment thereof taken in conjunction with the accompanying drawings, throughout which like parts are designated by like reference numerals, and wherein;

FIGS. 5a–5l together constitute a time chart showing the conditions of various switches in the parison control circuit, the location of a ring piston accommodated in an accumulator for extruding a main resin, the locations of plungers accommodated in accumulators for extruding respective auxiliary resins, and the like;

DETAILED DESCRIPTION OF THE PREFERRED EMBODIMENTS

Figure 2:
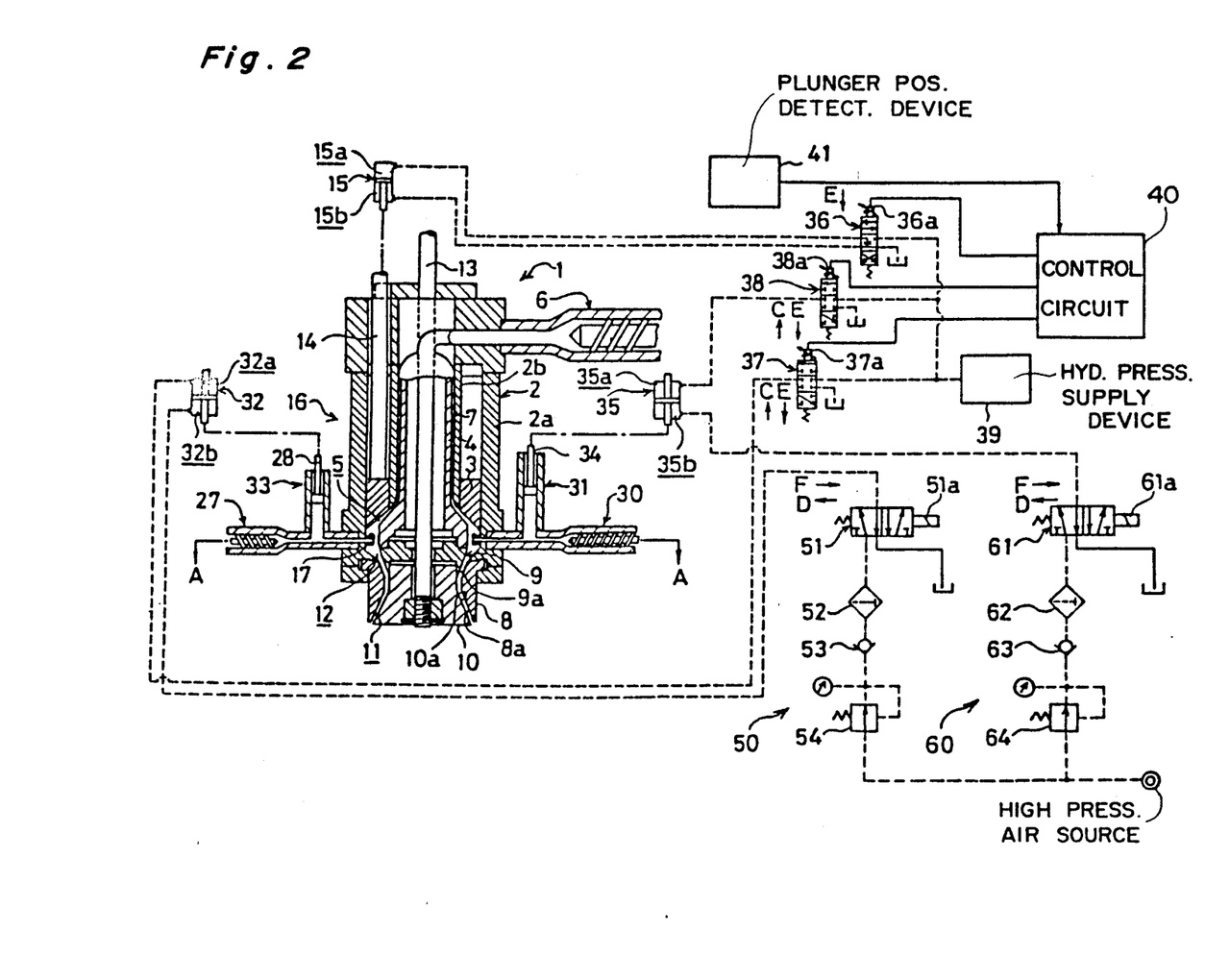
FIG. 2 is a diagram showing the construction of the multi-layer parison forming apparatus.

Referring now to the drawings, there is shown in FIG. 2, an accumulator head 1 which composes a multi-layer parison molding apparatus and is provided with an annular cylinder 2 comprising an outer wall 2a and an inner wall 2b coaxially formed with each other. A ring piston 3 which can reciprocate vertically is provided between the outer wall 2a and the inner wall 2b. The ring piston 3 is driven, through a plunger 14, by a first extrusion hydraulic cylinder 15 (hereinafter referred to as the first cylinder).

After a main resin such as a molten high density polyethylene is measured, it is pressurized in an accumulator 16 comprising the cylinder 2 and the ring piston 3. Thereafter, the main resin is extruded out of a die slit 11 which will be described later.

An annular communicating path 7 is provided between the inner side of the inner wall 2b and the peripheral face of a core 4 fixed to the cylinder 2. A resin storing chamber 5 is defined by the outer and inner walls 2a and 2b of the cylinder 2, the ring piston 3, and the core 4. The resin storing chamber 5 communicates with a first extruder 6 through the communicating path 7 so that the main resin is successively supplied to the resin storing chamber 5. A temperature adjusting device (not shown) is provided in the vicinity of the resin storing chamber 5 of the cylinder 2 so that the resin accommodated in the resin storing chamber 5 is kept at a predetermined temperature.

An annular die 8 is so fixed to a lower portion of the outer wall 2a of the cylinder 2 as to be coaxial with the cylinder 2. The lower inner peripheral face 8a of the die 8 is formed conically.

A core support 9 is so fixed to a lower portion of the core 4 as to be coaxial with the cylinder 2. The core support 9 is provided at its lower portion with a cylindrical portion 9a. A core 10, which is coaxial with the cylinder 2, is vertically slidably inserted in the cylindrical portion 9a of the core support 9. The lower outer peripheral face 10a of the core 10 is formed conically and an annular die slit 11 acting as a resin extruding nozzle is defined between the lower outer peripheral face 10a of the core 10 and the lower inner peripheral face 8a of the die 8. The die slit 11 communicates with the resin storing chamber 5 through a resin path 12 defined between the outer wall 2a of the cylinder 2 and the die 8, and the core 4 and the core support 9.

The core 10 is vertically driven by a hydraulic cylinder (not shown) through a rod 13 so that the width of the die slit 11 i.e., the thickness of a parison extruded from the die slit 11 is adjusted.

Figure 3:
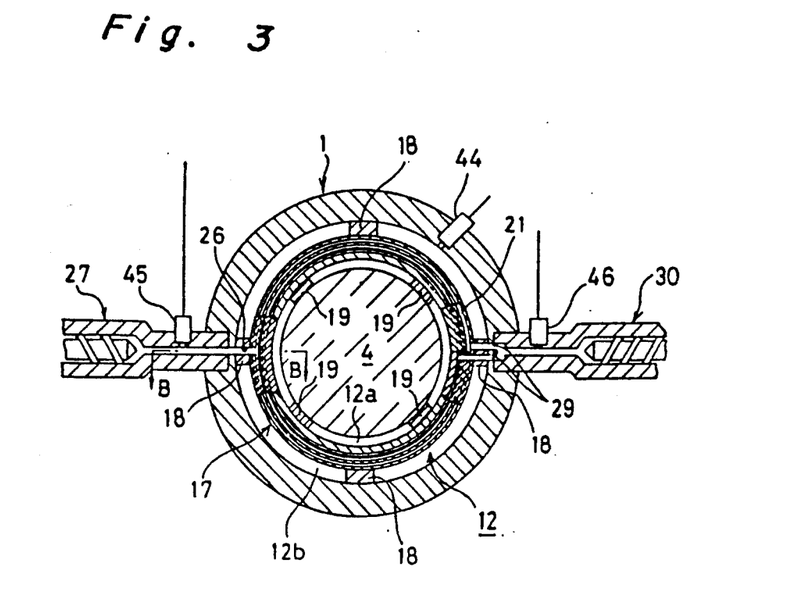
FIG. 3 is a section taken along the line 3—3 of FIG. 2.
Figure 4:
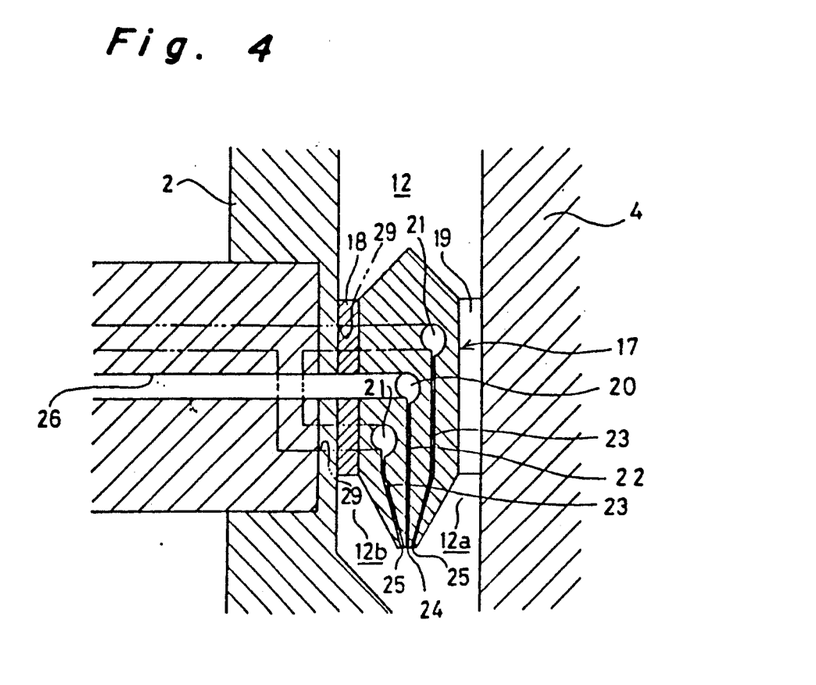
FIG. 4 is a section, on an enlarged scale, taken along the line 4—4 of FIG. 3.

As shown in FIGS. 3 and 4, the resin path 12 accommodates a ring member 17 coaxially disposed therewith and having a vertically elongated cross section. The ring member 17 is spaced from the inner peripheral face of the outer wall 2a of the cylinder by means of four supports 18 provided between the ring member 17 and the outer wall 2a of the cylinder 2. The ring member 17 is also spaced from the outer peripheral face of the core 4 by means of four supports 19 provided between the ring member 17 and the core 4 and disposed differently from the supports 18 in the circumferential direction of the core 4. That is, the ring member 17 divides the resin path 12 into an inner annular path 12a and an outer annular path 12b.

As shown in FIG. 4, a first auxiliary resin path 20 is annularly formed in the vicinity of the center of the ring member 17. Second auxiliary resin paths 21 are annularly formed on inner and outer sides of the first auxiliary resin path 20. Three annular nozzles 24, 25 and 25 which communicate with the resin paths 20, 21 and 21 through annular slits 22, 23 and 23 respectively, are formed in the lower face of the ring member 17.

The first auxiliary resin path 20 is communicated with a second extruder 27 provided outside the accumulator head 1 through a path 26 formed in one of the supports 18. The extruder 27 successively supplies a first auxiliary resin impermeable to liquid and thus serving as a barrier material to prevent liquid such as molten, nylon resin, gasoline and the like from passing therethrough.

The second extruder 27 is provided with an auxiliary resin extruding accumulator 33 for extruding the first auxiliary resin under pressure from the annular nozzle 24 of the ring member 17 after the molten first auxiliary resin has been measured. A plunger 28 of the auxiliary resin extruding accumulator 33 is driven by a second hydraulic extrusion cylinder 32. The auxiliary resin extruding accumulator 33 is provided with a temperature adjusting device (not shown) for keeping the first auxiliary resin accommodated in the auxiliary resin extruding accumulator 33 at a predetermined temperature.

The second auxiliary resin paths 21 are communicated with a third extruder 30 provided outside the accumulator head 1 through paths 29 formed in one of the supports 18 different from the support 18 in which the path 26 is formed. The third extruder 30 successively supplies the second auxiliary resin serving as an adhesive such as a molten modified polyethylene.

The third extruder 30 is provided with an auxiliary resin extruding accumulator 31 for extruding the second auxiliary resin under pressure from the annular nozzles 25 formed in the ring member 17 after the molten second auxiliary has been measured. A plunger 34 of the auxiliary resin extruding accumulator 31 is driven by a third hydraulic extrusion cylinder 35. Similarly to the auxiliary resin extruding accumulator 33, the auxiliary resin extruding accumulator 31 is provided with a temperature adjusting device (not shown) for keeping the second auxiliary resin accommodated in the auxiliary resin extruding accumulator 31 at a predetermined temperature.

Upper and lower cylinder chambers 15a and 15b of the first cylinder 15 are communicated with a hydraulic pressure supply device 39 through a first pressure servo valve 36.

An upper cylinder chamber 32a of the second extrusion cylinder 32 is communicated with the hydraulic pressure supply device 39 through a second pressure servo valve 37 and a lower cylinder chamber 32b thereof is communicated with a high pressure air source through an air supply device 50. The air supply device 50 comprises a solenoid valve 51, an oil separator 52, a check valve 53 and a pressure reducing valve 54 connected to one another in this order and supplies air at a predetermined pressure to the lower cylinder chamber 32b of the second extrusion cylinder 32.

Similarly to the second extrusion cylinder 32, an upper cylinder chamber 35a of the third extrusion cylinder 35 is communicated with the hydraulic pressure supply device 39 through a third pressure servo valve 38 and a lower cylinder chamber 35b thereof is communicated with the high pressure air source through an air supply device 60. The air supply device 60 comprises, similarly to the air supply device 60, a solenoid valve 61, an oil separator 62, a check valve 63 and a pressure reducing valve 64 coupled with each other in this order and supplies air at a predetermined pressure to the lower cylinder chamber 35b of the third extrusion cylinder 35.

A parison control circuit 40 is electrically connected to solenoids 36a through 38a of the first, second and third pressure servo valves 36 through 38 and to solenoids 51a and 61a of the solenoid valves 51 and 61. Thus, the solenoids 36a through 38a, 51a, and 61a are controlled by an exciting signal outputted from the parison control circuit 40. The parison control circuit 40 is also electrically connected to a plunger position detecting device 41 mounted on the first cylinder 15. The plunger position detecting device 41 outputs a signal to the parison control circuit 40 corresponding to the vertical position of the ring piston 3 of the main resin extruding accumulator 16.

Figure 1:
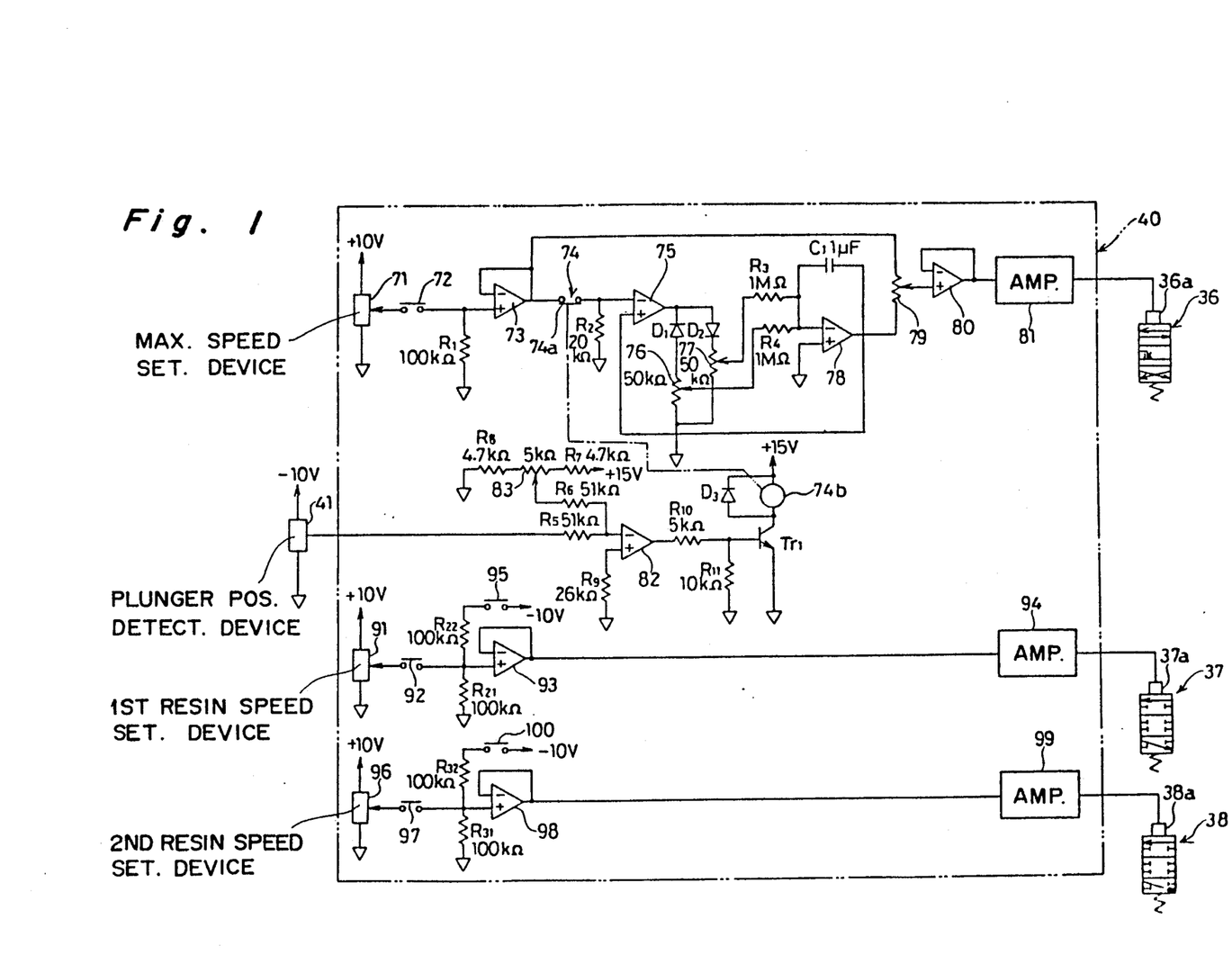
FIG. 1 is a circuit diagram of a parison control circuit provided in a multi-layer parison forming apparatus according to the present invention.

The parison control circuit 40 controls the first and second auxiliary resins so that pressures for extruding the first and second auxiliary resins increase promptly and a pressure for extruding the main resin gradually increases when the extrusion of the main and auxiliary resins is started. The construction of the parison control circuit 40 is, for example, as shown in FIG. 1.

The parison control circuit 40 includes a device 71 comprising a variable resistor for setting the maximum speed in extruding the main resin (device 71 is hereinafter referred to as main resin maximum extrusion speed setting device). One of the fixed terminals of the main resin maximum extrusion speed setting device 71 is connected to a power source of +10 V and the other fixed terminal thereof is grounded.

A movable terminal of the main resin maximum extrusion speed setting device 71 is connected to a positive input terminal of an operational amplifier 73, which operates as a voltage follower, through a main resin extrusion start relay switch 72. The positive input terminal of the operational amplifier 73 is grounded through a resistor $R_1$ of 100 k$\Omega$.

An output terminal of the operational amplifier 73 is connected to the negative input terminal thereof, a fixed terminal of a device 79 for setting the minimum speed in extruding the main resin (hereinafter referred to as main resin minimum extrusion speed setting device) which is described later, and a negative input terminal of an operational amplifier 75 through a normally closed contact 74a of a main resin extrusion stop relay 74. The negative input terminal of the operational amplifier 75 is grounded through a resistor $R_2$ of 20 k$\Omega$. A positive input terminal of the operational amplifier 75 is connected to an output terminal of an operational amplifier 78 which is described later.

An output terminal of the operational amplifier 75 is connected to a cathode of a diode $D_1$ and an anode of a diode $D_2$. An anode of the diode $D_1$ and a cathode of the diode $D_2$ are grounded through a device 76 for setting the pressure increasing period for starting the extrusion of the main resin (hereinafter referred to as pressure increasing period setting device) and a device 77 for setting the pressure reducing period for terminating the extrusion of the main resin (hereinafter referred to as pressure reducing period setting device), respectively. Movable terminals of the pressure increasing period setting device 76 and the pressure reducing period setting device 77 are connected, through resistors $R_3$ and $R_4$ respectively, to a negative terminal of the operational amplifier 78 which operates as an integrator, a positive terminal of which is grounded.

The output terminal of the operational amplifier 78 is connected to the negative input terminal of the operational amplifier 78 through a capacitor $C_1$. As described above, the output terminal of the operational amplifier 78 is connected to the input terminal of the operational amplifier 75 and a fixed terminal of the main resin minimum extrusion speed setting device 79 comprising a variable resistor of 100 k$\Omega$.

A movable terminal of the main resin minimum extrusion speed setting device 79 is connected to a positive input terminal of an operational amplifier 80 which operates as a voltage follower. An output terminal of the operational amplifier 80 is connected to a negative input terminal thereof and the solenoid 36a of the first servo valve 36 through a servo amplifier 81 which generates electric current corresponding to a voltage outputted from the operational amplifier 80.

The plunger position detecting device 41 mounted on the first cylinder 15 comprises a variable resistor, one fixed terminal of which is connected to, for example, a power source of −10 V and the other fixed terminal of which is grounded. A movable terminal of the plunger position detecting device 41 is connected to a negative terminal of an operational amplifier 82, which operates as a comparator, through a resistor $R_5$ of 51 k$\Omega$. The negative terminal of the operational amplifier 82 is connected through a resistor $R_6$ of 51 k$\Omega$ to a movable terminal of a device 83, for setting the main resin extrusion stop position, comprising a variable resistor of 5 k$\Omega$. One of fixed terminals of the main resin extrusion stop position setting device 83 is connected to a power source of +15 V through a resistor $R_7$ of 4.7 k$\Omega$ and the other fixed terminal is grounded through a resistor $R_8$ of 4.7 k$\Omega$.

A positive terminal of an operational amplifier 82 is grounded through a resistor $R_9$ of 26 k$\Omega$ and the output terminal thereof is connected to a base of a transistor $Tr_1$ through a resistor $R_{10}$ of 5 k$\Omega$.

The base of the transistor $Tr_1$ is grounded through a resistor $R_{11}$ of 10 k$\Omega$ and an emitter thereof is directly grounded. A collector of the transistor $Tr_1$ is connected to a power source of +15 V through a diode $D_3$ and a exciting coil 74b of the main resin extrusion stop relay 74 connected in parallel with each other.

The parison control circuit 40 includes first and second auxiliary resin extrusion speed setting devices 91 and 96, each of which comprises a variable resistor. One fixed terminal of each of the first and second auxiliary resin extrusion speed setting devices 91 and 96 is connected to a power source of +10 V and the other fixed terminal thereof is grounded.

Movable terminals of the first and second auxiliary resin extrusion speed setting devices 91 and 96 are connected, through first and second auxiliary resin extrusion starting relay switches 92 and 97, to positive input terminals of operational amplifiers 93 and 98, respectively, which operate as voltage followers. The positive input terminals of the operational amplifiers 93 and 98 are grounded through resistors $R_{21}$ and $R_{31}$ and connected to power sources of $-10$ V through resistor $R_{22}$ and $R_{32}$ and first and second auxiliary resin storage start relay switches 95 and 100, respectively.

Output terminals of the operational amplifier 93 and 98 are connected to respective negative input terminals and the solenoids 37a and 38a of the second and third servo valves 37 and 38 through servo amplifiers 94 and 99, respectively, each of which generates electric current corresponding to a voltage outputted from the operational amplifier 93 or 98.

Figures 5A, 5B, 5C, 5D, 5E:
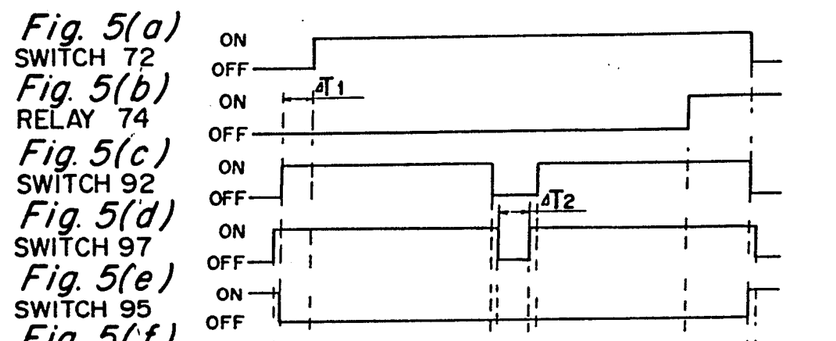

A timing control circuit (not shown) controls the main resin extrusion start relay switch 72, the first auxiliary resin extrusion start relay switch 92, and the second auxiliary resin extrusion start relay switch 97. As shown in FIG. 5d, the second auxiliary resin extrusion start relay switch 97 is initially turned on, and after a predetermined short period of time has elapsed, the first auxiliary resin extrusion start relay switch 92 is turned on, as shown in FIG. 5c. Upon passage of a period of time $\Delta T_1$ after the first auxiliary resin extrusion start relay switch 92 has been turned on, the main resin extrusion start relay switch 72 is turned on, as shown in FIG. 5a so that a predetermined amount of the main resin is extruded. Thereafter, the first auxiliary resin extrusion start relay switch 92 is turned off at first, as shown in FIG. 5d, and subsequently, the second auxiliary resin extrusion start relay switch 97 is turned off and kept off during a period of time $\Delta T_2$, as shown in FIG. 5d. Then, the second and first auxiliary resin extrusion start relay switches 97 and 92 are sequentially turned on again.

When the predetermined amount of the main resin is further extruded, the main resin extrusion start relay switch 72 and the first auxiliary resin extrusion start relay switch 92 are turned off simultaneously, as shown in FIGS. 5a and 5c. After a short period of time, the second auxiliary resin extrusion start relay switch 97 is turned off, as shown in FIG. 5d.

Figures 5F, 5G, 5H:
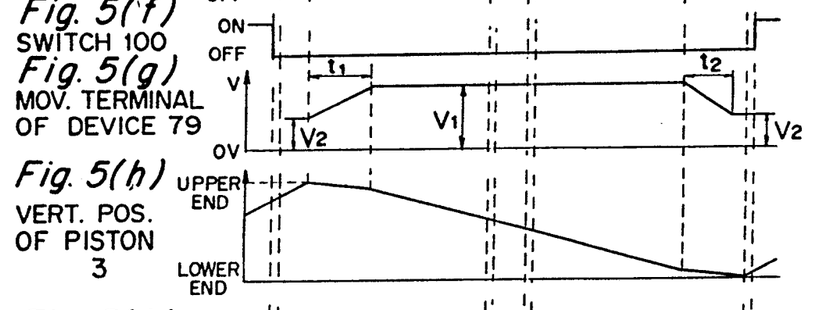

The first and second auxiliary resin storage start relay switches 95 and 100 are turned on by the control of the timing control circuit when the first and second resin extrusion start relay switches 92 and 97 are turned off, respectively as shown in FIGS. 5e and 5f, and consequently the auxiliary resin is supplied to the auxiliary resin extruding accumulators 31 and 33.

In the above-described construction, the extrusion of the first and second auxiliary resins is conducted two times during one cycle of the extrusion process of the main resin. When a multi-layer parison is molded, the second and first auxiliary resin extrusion start relay switches 97 and 92 of the parison control circuit 40 are sequentially turned on according to the control of the timing control circuit as shown in FIGS. 5d and 5c. As a result, the operational amplifiers 93 and 98 immediately output respective voltages equal to voltages set by the first and second auxiliary resin extrusion speed setting devices 91 and 96, and the servo amplifiers 94 and 99 output respective electric currents corresponding to the voltages outputted from the operational amplifiers 93 and 98 to the solenoids 37a and 38a of the second and third pressure servo valves 37 and 38.

As a result, the second and third pressure servo valves 37 and 38 operate in the direction shown by arrows E in FIG. 2. The solenoid valves 51 and 61 operate in the direction shown by arrows F in FIG. 2 according to the control of the parison control circuit 40.

Consequently, hydraulic oil is supplied from the hydraulic pressure supply device 39 to the upper cylinder chamber 32a of the second extrusion cylinder 32 and the upper cylinder chamber 35a of the third extrusion cylinder 35, while air accommodated in the lower cylinder chambers 32b and 35b is drained through the solenoid valves 51 and 61, respectively. In this event, the hydraulic oil never enters the high pressure air source because the air supply devices 50 and 60 are provided with the oil separators 52 and 62 and the check valves 53 and 63, respectively.

Figure 5I:
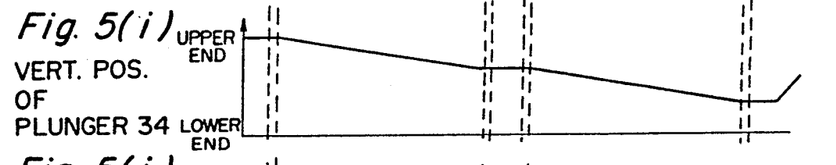

When the hydraulic oil is supplied to the upper chambers 32a and 35a, the second and third extrusion cylinders 32 and 35 are driven to move forward, and therefore, the plungers 28 and 34 of the auxiliary resin extruding accumulators 33 and 31 are moved downward, as shown in FIGS. 5f and 5i. Consequently, the pressures for extruding the first and second auxiliary resins increase rapidly. Upon downward movement of the plungers 28 and 34, the first and second auxiliary resins accommodated in the auxiliary resin extruding accumulators 33 and 31 pass through the paths 26 and 29, the first and second auxiliary resin paths 20 and 21 and the slits 22 and 23, respectively. Thus, the first and second auxiliary resins are started to be extruded from the annular nozzles 24 and 25 into the space between inner and outer layers of the main resin which has been divided by the ring member 17.

Upon passage of the period of time $\Delta T_1$ after the first auxiliary resin extrusion start relay switch 92 is turned on, the main resin extrusion start relay switch 72 is turned on, as shown in FIG. 5a, by the control of the timing control circuit.

As a result, the operational amplifier 73 outputs a voltage equal to a voltage $v_1$ set by the main resin maximum extrusion speed setting device 71 and the operational amplifier 75 outputs a negative voltage. When the negative voltage is outputted from the operational amplifier 75, electric current flows from the ground to the circuit through the pressure increasing period setting device 76, the diode $D_1$ and the output terminal of the operational amplifier 75. Further, a negative voltage, divided in correspondence with the setting of the pressure increasing period setting device 76, is generated in the movable terminal of the pressure increasing period setting device 76.

The voltage generated in the movable terminal of the pressure increasing period setting device 76 is inverted into a positive voltage by the operational amplifier 78. Thus, an integrated voltage is outputted from the operational amplifier 78. That is, the output voltage of the operational amplifier 78 gradually increases from 0 V. Upon passage of a period of time $t_1$ determined in correspondence with the setting of the pressure increasing period setting device 76, the output voltage of the operational amplifier 78 becomes equal to the voltage outputted from the operational amplifier 73, because the output terminal of the operational amplifier 78 is connected to the positive input terminal of the operational amplifier 75.

On the other hand, both fixed terminals of the main resin minimum extrusion speed setting device 79 are connected to the output terminal of the operational amplifier 73 and that of the operational amplifier 78. Accordingly, a voltage, divided from the voltage difference between the output terminal of the operational amplifier 73 and that of the operational amplifier 78 in correspondence with the setting of the main resin minimum extrusion speed setting device 79, is generated in the movable terminal of the main resin minimum extrusion speed setting device 79.

More specifically, immediately after the main resin extrusion start relay switch 72 is turned on, the voltage of the output terminal of the operational amplifier 73 becomes equal to the voltage $v_1$ set by the main resin maximum extrusion speed setting device 71 while the voltage of the output terminal of the operational amplifier 78 becomes 0 V. Subsequently, as shown in FIG. 5g, a voltage $v_2$, divided from the voltage $v_1$ set by the main resin maximum extrusion speed setting device 71 in correspondence with the setting of the main resin minimum extrusion speed setting device 79, is generated in the movable terminal of the main resin minimum extrusion speed setting device 79. Further, the voltage of the output terminal of the operational amplifier 78 gradually increases and becomes equal to the voltage of the output terminal of the operational amplifier 73 upon passage of the period of time $t_1$ set by the pressure increasing period setting device 76. As a result, a voltage equal to the voltage $v_1$ set by the main resin maximum extrusion speed setting device 71 is generated in the movable terminal of the main resin minimum extrusion speed setting device 79.

The operational amplifier 80 outputs a voltage equal to a voltage generated in the movable terminal of the main resin minimum extrusion speed setting device 79 and the servo amplifier 81 outputs electric current corresponding to the voltage outputted from the operational amplifier 80.

The first pressure servo valve 36 operates in the direction shown by the arrow E in FIG. 2 in correspondence with the electric current generated by the first servo amplifier 81. As a result, hydraulic oil is supplied from the hydraulic pressure supply device 39 to the upper cylinder chamber 15a of the first cylinder 15 and the hydraulic oil accommodated in the lower cylinder chamber 15b thereof is drained through the first pressure servo valve 36.

Consequently, the first cylinder 15 is driven forward, thus moving the ring piston 3 of the main resin extruding accumulator 16 downward. The main resin stored in the main resin extruding accumulator 16 is extruded to the resin path 12 due to the downward movement of the ring piston 3. Subsequently, the main resin is divided into inner and outer layers at the upper portion of the ring member 17. The second auxiliary resin layers extruded from the annular nozzles 25 and the first auxiliary resin layer extruded from the annular nozzle 24 are formed between the inner and outer layers of the main resin. A five-layer parison consisting of three kinds of resins formed in this way is extruded through the die slit 11.

Figure 5J:
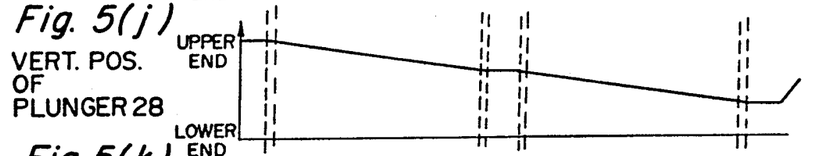
Figure 5K:
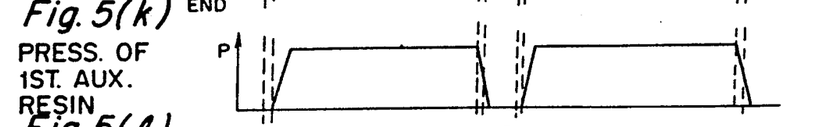

Graphs of FIGS. 5h, 5i, and 5j respectively represent the vertical position of the ring piston 3, that of the plunger 34 of the auxiliary resin extruding accumulator 31 and that of the plunger 28 of the auxiliary resin extruding accumulator 33 in one cycle of the above described extrusion process. A graph in FIG. 5g represents the voltage of the movable terminal of the main resin minimum extrusion speed setting device 79. The pressure for extruding the main resin is in proportion to this voltage. Graphs of FIGS. 5K and 5I represent the pressures for extruding the first and second auxiliary resins, respectively, and correspond to the graph of FIG. 5g.

During the period of time $t_1$ determined in correspondence with the setting of the pressure increasing period setting device 76, the pressure of the main resin increases from the pressure determined in correspondence with the setting of the main resin minimum extrusion speed setting device 79 up to the pressure determined in correspondence with the setting of the main resin maximum extrusion speed setting device 71. That is, the pressures for extruding the first and second auxiliary resins rapidly increase whereas the pressure for extruding the main resin gradually increases. Accordingly, the first and second auxiliary resins disposed in the outlets of the annular nozzles 24 and 25 are not drawn by the main resin so much. Even though the first and second auxiliary resins are drawn by the main resin to some extent, hardly any discontinuousness of their layers is caused. Therefore, the layers of first and second auxiliary resins formed in the current cycle can be reliably continuously joined with those formed in the previous cycle.

Upon downward movement of the ring piston 3 of the main resin extruding accumulator 16 and the plungers 28 and 34 of the auxiliary resin extruding accumulators 33 and 31 by respective predetermined lengths, the main and auxiliary resins are extruded from the annular nozzles 11, 24 and 25. When the multi-layer parison is formed to a predetermined length, the first resin extrusion start relay switch 92 is kept off during a predetermined period slightly longer than the period of time $\Delta T_2$, as shown in FIG. 5c and the second auxiliary resin extrusion start relay switch 97 is kept off during the period of time $\Delta T_2$, as shown in FIG. 5d, by the control of the timing control circuit. As a result, both the operational amplifiers 93 and 98 output a voltage of 0 V, because respective positive input terminals are grounded through resistors $R_{21}$ and $R_{31}$ of 100 k$\Omega$, respectively.

When the voltage of 0 V is outputted from the operational amplifiers 93 and 98, no electric current is outputted from the servo amplifiers 94 and 99. As a result, the second and third pressure servo valves 37 and 38 are returned to their respective neutral positions. Thus, the second and third extrusion cylinders 32 and 35 are locked, so that the extrusion of the first and second auxiliary resins is stopped. Thereafter, instead of the multi-layer parison, a single layer parison consisting of only the main resin is formed.

Upon passage of the period of time $\Delta T_2$ after the second auxiliary resin extrusion start relay switch 97 is turned off, this switch 97 is turned on again and the first auxiliary resin extrusion start relay switch 92 is subsequently turned on again by the control of the timing control circuit. As a result, the extrusion of the first and second auxiliary resins is resumed and the next multi-layer parison is formed following the single layer parison of the main resin previously formed in the predetermined length.

Upon further downward movement of the ring piston 3 of the main resin extruding accumulator 16, the electric potential of the movable terminal of the plunger position detecting device 41 electrically connected to the parison control circuit 40 decreases in the range from 0 V to $-10$ V in correspondence with the amount of downward movement of the ring piston 3. The electric potential of the negative input terminal of the operational amplifier 82 becomes negative when the absolute value of the movable terminal of the plunger position detecting device 41 becomes greater than that of the electric potential generated in the movable terminal of the main resin extrusion stop position setting device 83 by the setting of the main resin extrusion stop position setting device 83.

When the electric potential of the negative input terminal of the operational amplifier 82 becomes negative, the operational amplifier 82 outputs a positive voltage and the transistor $Tr_1$ is turned on. The exciting coil 74b of the main resin extrusion stop relay 74 is excited and the normally closed contact 74a is turned off.

Since the negative input terminal of the operational amplifier 75 is grounded through the resistor $R_2$, the electric potential thereof becomes 0 V and the operational amplifier 75 outputs a positive voltage. When the positive voltage is outputted from the operational amplifier 75, electric current flows to the ground through the diode $D_2$ and the pressure reducing period setting device 77. Further, a positive voltage, divided in correspondence with the setting of the pressure reducing period setting device 77, is generated in the movable terminal thereof.

The voltage generated in the movable terminal of the pressure reducing period setting device 77 is inverted to a negative voltage by the operational amplifier 78 and an integrated voltage is outputted therefrom. More specifically, the output voltage of the operational amplifier 78 gradually decreases from the voltage equal to the voltage outputted from the operational amplifier 73 before the main resin extrusion stop relay 74 is turned off. Since the output terminal of the operational amplifier 78 is connected to the positive input terminal of the operational amplifier 75, the output voltage of the operational amplifier 78 becomes equal to the voltage of 0 V to be inputted to the negative input terminal of the operational amplifier 75 upon passage of the period of time $t_2$ determined according to the setting of the pressure reducing period setting device 77.

Both the fixed terminals of the main resin minimum extrusion speed setting device 79 are connected to the output terminals of the operational amplifier 73 and the operational amplifier 78. Therefore, a voltage, divided from the voltage difference between the output terminal of the operational amplifier 73 and that of the operational amplifier 78 in correspondence with the setting of the main resin minimum extrusion speed setting device 79, is generated in the movable terminal of the main resin minimum extrusion speed setting device 79.

In other words, the voltages of the output terminals of the operational amplifiers 73 and 78 are equal to the voltage $v_1$ set by the main resin maximum extrusion speed setting device 71 immediately after the normally closed contact 74a of the main resin extrusion stop relay 74 is turned off. Consequently, a voltage equal to the voltage $v_1$ set by the main resin maximum extrusion speed setting device 71 is generated in the movable terminal of the main resin minimum extrusion speed setting device 79.

Upon passage of the period of time $t_2$ set by the pressure reducing period setting device 77, the voltage of the output terminal of the operational amplifier 78 gradually decreases and finally becomes 0 V. As a result, a voltage $v_2$, divided from the voltage $v_1$ set by the main resin maximum extrusion speed setting device 71 according to the setting of the main resin minimum extrusion speed setting device 79, is generated in the movable terminal of the main resin minimum extrusion speed setting device 79.

The operational amplifier 80 outputs a voltage equal to a voltage generated in the movable terminal of the main resin minimum extrusion speed setting device 79. The servo amplifier 81 outputs electric current corresponding to the voltage outputted by the operational amplifier 80.

The first pressure servo valve 36 gradually returns toward its neutral position in correspondence with the electric current generated by the servo amplifier 81. Consequently, the amount of hydraulic oil supplied from the hydraulic pressure supply device 39 to the upper cylinder chamber 15a of the first cylinder 15 decreases and the pressure inside the main resin extruding accumulator 16 gradually decreases.

During the period of time $t_2$ determined in correspondence with the setting of the pressure reducing period setting device 77, the pressure of the main resin increases from the pressure determined in correspondence with the setting of the main resin maximum extrusion speed setting device 71 up to the pressure determined in correspondence with the setting of the main resin minimum extrusion speed setting device 79. Accordingly, neither a slight change in the volume thereof nor the back flow thereof occurs rapidly due to the reduction of the pressure for extruding the main resin. Further, a first and second auxiliary resins disposed in the outlets of the annular nozzles 24 and 25 are prevented from being drawn by the main resin and no discontinuousness of their layers is caused.

Figure 5L:
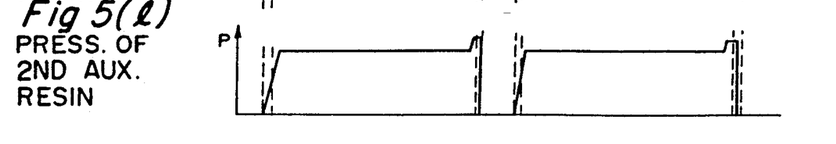

The ring piston 3 of the main resin extruding accumulator 16 and the plungers 28 and 34 of the auxiliary resin extruding accumulators 33 and 31 further move downward, thus extruding the respective resins. At the end of extrusion of the resins, the pressure for extruding the second auxiliary resin is increased to some extent, as shown in the graph of FIG. 5l, so that the end of the first auxiliary resin layer is completely covered with the second auxiliary resin. When the multi-layer parison is formed to the predetermined length, the main resin extrusion start relay switch 72 and the first resin extrusion start relay switch 92 are turned off simultaneously, and the second resin extrusion start relay switch 97 is subsequently turned off by the control of the timing control circuit.

Since the positive input terminal of the operational amplifier 73 is grounded through the resistor $R_1$ of 100 kΩ, the operational amplifier 73 outputs a voltage of 0 V. Consequently, the voltages of both fixed terminals of the main resin minimum extrusion speed setting device 79 become 0 V and the operational amplifier 80 outputs a voltage of 0 V as well. In this event, the operational amplifiers 93 and 98 output a voltage of 0 V, because the positive input terminals of the operational amplifiers 93 and 98 are grounded through the resistor $R_{21}$ of 100 kΩ and the resistor $R_{31}$ of 100 kΩ, respectively.

When the operational amplifiers 80, 93 and 98 output a voltage of 0 V, no electric current is outputted from the servo amplifiers 81, 94, and 99. As a result, the first, second and third pressure servo valves 36, 37 and 38 return to their neutral positions. Consequently, the forward movement of the first cylinder 15 is stopped, and therefore, the extrusion of the main resin is stopped. In this event, since the second and third extrusion cylinders 32 and 35 are locked, the extrusion of the first and second auxiliary resins are stopped. Thus, the extrusion molding of the multi-layer parison is stopped.

As described above, since the pressure of the main resin is reduced to the pressure determined according to the setting of the main resin minimum extrusion speed setting device 79, the first and second auxiliary resins disposed in the outlets of the annular nozzles 24 and 25 are prevented from being drawn by the main resin. Accordingly, the first and second auxiliary resin layers to be newly formed can be reliably continued even when a multi-layer parison is formed in a process one cycle previous to the current process.

When the first pressure servo valve 36 returns to its neutral position, the first cylinder 15 is free to move. As a result, the main resin fed to the main resin extruding accumulator 16 from the first extruder 6 through the communicating path 7 is stored in the resin storing chamber 5 and the amount thereof is measured while the main resin is pushing the ring piston 3 upward.

When the first and second auxiliary resin extrusion start relay switches 92 and 97 are turned off, the first and second auxiliary resin storage start relay switches 95 and 100 are turned on by the control of the timing control circuit. When the storage start relay switches 95 and 100 are turned on, the operational amplifiers 93 and 98 output respective negative voltages, and each of the servo amplifiers 94 and 99 outputs electric current corresponding to each of the voltages outputted from the operational amplifiers 93 and 98 to the solenoid 37a of the second pressure servo valve 37 and the solenoid 38a of the third pressure servo valve 38.

Consequently, the second and third pressure servo valves 37 and 38 operate in the direction shown by the arrows C. The parison control circuit 40 controls the solenoid valves 51 and 61 so that the solenoid valves 51 and 61 operate in the direction shown by the arrows D.

The hydraulic oil stored in the upper cylinder chambers 32a and 35a of the second and third extrusion cylinders 32 and 35 is drained through the second and third pressure servo valves 37 and 38, respectively, while air, the pressure of which has been reduced to a predetermined pressure by the pressure reducing valves 54 and 64 of the air supply devices 50 and 60 is supplied to the lower cylinder chambers 32b and 35b. Thus, force which almost removes drag such as their own weights and sliding resistance caused by the upward movement of the plungers 28 and 34 acts on the plungers 28 and 34 of the auxiliary resin extruding accumulators 33 and 31. As a result, the plungers 28 and 34 remain unmoved when no external force is applied thereto while the plungers 28 and 34 are easily moved upward even when a small amount of external force directed upward is exerted upon them.

Accordingly, when the first and second auxiliary resins are fed from the second extruder 27 and the third extruder 30 to the auxiliary resin extruding accumulators 33 and 31, respectively, these resins push the plungers 28 and 34 upward with little increase of pressure thereof. Thus, the first and second auxiliary resins are stored and measured in the auxiliary resin extruding accumulators 33 and 31. Since the pressures for extruding the first and second auxiliary resins hardly increase, these resins never leak from the annular nozzles 24 and 25.

While resins are being supplied to the accumulators 16, 33 and 31, the multi-layer parison formed in the process one cycle prior to the current cycle is introduced into a molding cavity (not shown), there being blow-molded into a desired configuration, for example, a fuel tank or the like.

When the ring piston 3 of the main resin extruding accumulator 16 moves upward to a predetermined position and a predetermined amount of the main resin is stored therein, the second and first auxiliary resin extrusion start relay switches 97 and 92 are sequentially turned on again by the control of the timing control circuit. Upon passage of the period of time $\Delta T_1$ after the first auxiliary resin extrusion start relay switch 92 has been turned on, the main resin extrusion start relay switch 72 is turned on. Thus, similar operations are repeated and a parison having alternate single and multiple layers is formed.

As is apparent from the above description, when the extrusion of the resins is started, the pressure for extruding the main resin increases gradually by the control of the parison control circuit 40. Accordingly, the first and second auxiliary resins disposed in the outlets of the annular nozzles 24 and 25 are not drawn by the main resin so much. On the other hand, since the pressures for extruding the first and second auxiliary resins are so controlled as to rapidly increase immediately after the extrusion thereof is started, the discontinuousness of their layers is unlikely to take place even when these resins are drawn by the main resin.

Further, upon passage of the period of time $\Delta T_1$ after the extrusion of the first auxiliary resin is started, the extrusion of the main resin is started. In addition, when the extrusion of the main resin is stopped, the pressure for extruding the main resin gradually decreases. Therefore, the discontinuousness of the first and second auxiliary resin layers is also unlikely to take place.

Accordingly, the discontinuousness of the auxiliary resin layers can be reliably prevented when the extrusion of resins is started.

When the first and second auxiliary resins are supplied to the auxiliary resin extruding accumulators 33 and 31, external force is applied to the plungers 28 and 34 so that drag such as their own weights and sliding resistance caused by the upward movement thereof is almost removed. Thus, projected portions can be prevented from being formed in respective layers composing a multi-layer parison. Thus, a multi-layer parison can be reliably formed, which consists of laminated layers of resins each having a thickness within a predetermined allowable range.

Figure 6A:
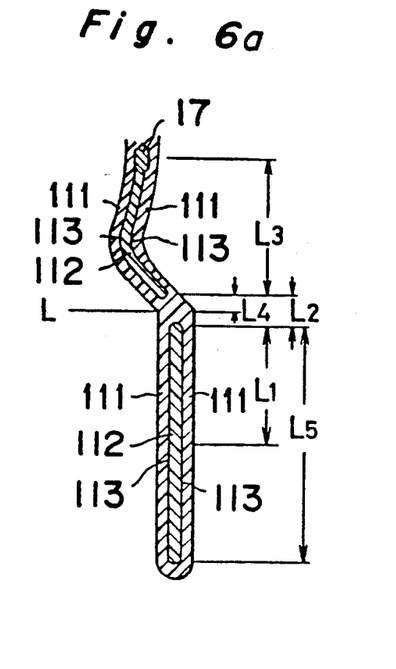
FIGS. 6a and 6b depict the extruding conditions of the main and auxiliary resins.
Figure 6B:
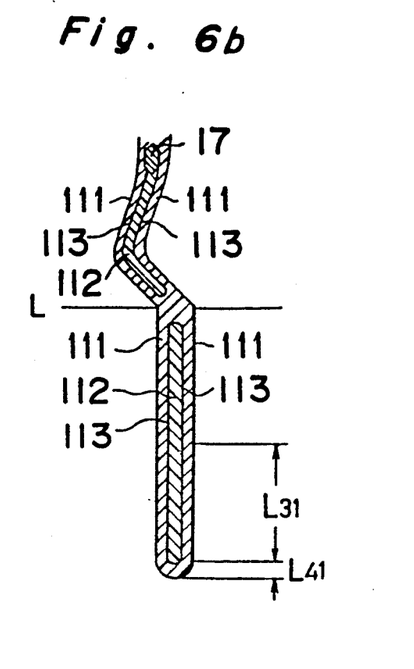

FIGS. 6a and 6b depict the extruding conditions of the main resin and the auxiliary resins during one molding process and during the next molding process of the parison, respectively.

In FIGS. 6a and 6b, a portion corresponding to L1 with an effective length L5 of the parison is formed during a period of time in which the second auxiliary resin extrusion start relay switch 97 is kept on in FIG. 5d. A burr portion corresponding to L2, which consists of only the main resin 111, is formed during the period of time $\Delta T_2$. In the next molding process, a portion corresponding to L3 in FIG. 6a is located at a position shown by L31 in FIG. 6b, and a portion L4 on the end toward the die consisting of only the main resin 111 is located at a position shown by L41 below the portion L31. In these figures, the reference character L represents a boundary between the end toward the die and the end toward and a mold assembly.

When the extruding conditions of FIG. 6a are shifted to those of FIG. 6b and if the main and auxiliary resins 111, 112 and 113 are extruded simultaneously, as in the prior art, the extruded auxiliary resin layers 112 and 113 would not be continuously joined with those formed below the ring member 17 in the previous process. Such phenomenon often results in a poor parison. The auxiliary resin layers 112 and 113 formed in the current process can be desirably continuously joined with those formed in the previous process by conducting the extrusion of the auxiliary resins 112 and 113 prior to the extrusion of the main resin 111. In this event, the auxiliary resin layers 112 and 113 are completely covered with the main resin layer 111, as shown in FIGS. 6a and 6b.

The apparatus according to the present invention is highly conducive to the molding of high quality parisons with reduced burr portions. Since the burr portions consist of only the main resin 111, they are recovered and used again.

Figure 7:
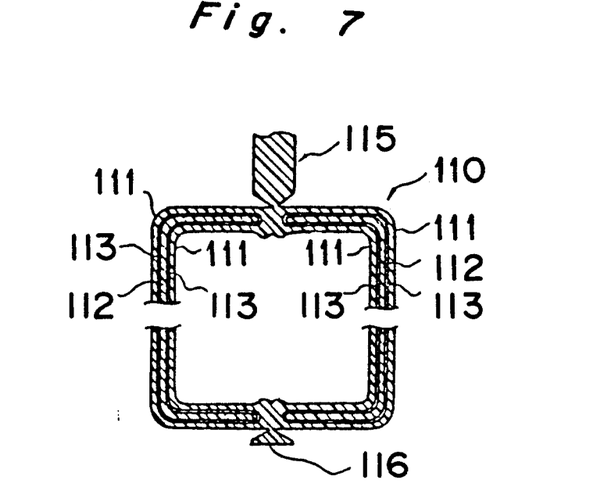
FIG. 7 is a sectional view of a multi-layer container produced by the blow molding.

FIG. 7 depicts a multi-layer container 110 molded by the use of the apparatus according to the present invention, which container 110 has five layers of three kinds of resins 111, 112 and 113. This container 110 includes two burr portions 115 and 116 on its upper and lower sides, which consist of only the main resin 111.

In this embodiment, although the explanation is made with respect to the case in which a multi-layer parison having five layers is formed with the use of three kinds of resins, multi-layer parisons of various constructions can be formed. For example, a three-layer parison can be formed using three kinds of resins.

Moreover, although the auxiliary resins are used to form barrier or adhesive layers in the above described embodiment, they may be used to strengthen a multi-layer parison.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An apparatus for forming a succession of multi-layer parisons each having a plurality of layers of main and auxiliary materials laminated with each other and having leading and trailing ends constituted by only main material, said apparatus comprising:
    a first extruding means for extruding a layer of main material;
    a second extruding means for extruding a layer of at least one auxiliary material into a laminated relationship with said layer of main material;
    first control means connected to said extruding means for controlling the extruding cycles of said first and second extruding means for substantially simultaneously extruding the main material and the auxiliary material starting from a condition in which a part of a previously extruded length constituted of main material having at its leading end a portion of only main material and the remainder of which is a layer of main material and a layer of at least one auxiliary material laminated thereto and extending from the respective extruding means, and continuing the simultaneous extrusion for a first predetermined time with the respective extruded layers integral with the extruded layers of the previously extruded length, then extruding only the main material for a second predetermined time, and then again substantially simultaneously extruding the main material and the auxiliary material for a third predetermined time;
    second control means for controlling said extruding means for causing a rise in the extrusion pressure of the auxiliary material at the start of the first predetermined time faster than the rise in the extrusion pressure of the main material at the start of the first predetermined time; and
    third control means for controlling the extruding pressure of the main material so that the rise in pressure for extruding the main material at the start of the first predetermined time is gradual.

2. The apparatus according to claim 1, wherein said third control means gradually reduces the pressure for extruding said main material at the end of extrusion of said main material.

3. A method for forming a succession of multi-layer parisons each having a plurality of layers of main and auxiliary materials laminated with each other and having leading and trailing ends constituted by only main material, said method comprising:
    controlling the extruding cycles of a first extruding means for extruding a layer of main material and a second extruding means for extruding a layer of at least one auxiliary material into a laminated relationship with said layer of main material for substantially simultaneously carrying out the extrusions starting from a condition in which a part of a previously extruded length constituted of main material having at its leading end a portion of only main material and the remainder of which is a layer of main material and a layer of at least one auxiliary material laminated thereto and extending from the respective extruding means, and continuing the simultaneous extrusion for a first predetermined time with the respective extruded layers integral with the extruded layers of the previously extruded length, then extruding only the main material for a second predetermined time, and then again substantially simultaneously extruding the main material and the auxiliary material for a third predetermined time;
    controlling said extruding means for causing a rise in the extrusion pressure of the auxiliary material at the start of the first predetermined time faster than the rise in the extrusion pressure of the main material at the start of the first predetermined time; and
    controlling the extruding pressure of the main material so that the rise in pressure for extruding the main material at the start of the first predetermined time is gradual.

4. The apparatus according to claim 1, wherein said multi-layer parison forms a fuel tank and said auxiliary material comprises a barrier material for preventing fuel from permeating therethrough.

5. The apparatus according to claim 1, wherein said auxiliary material further comprises an adhesive material for bonding said barrier material with said main material.

6. The method according to claim 3, further comprising the step of gradually decreasing the pressure for extruding said main material before stopping the extrusion of said main material.

* * * * *